(12) United States Patent  
Fu

(10) Patent No.: US 8,035,874 B1  
(45) Date of Patent: Oct. 11, 2011

(54) MEMS DEVICE WITH OFF-AXIS ACTUATOR

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 374 days.

(21) Appl. No.: 12/392,607

(22) Filed: Feb. 25, 2009

(51) Int. Cl.
   *G02B 26/08* (2006.01)
(52) U.S. Cl. ............... 359/199.2; 359/199.1; 359/224.1
(58) Field of Classification Search .... 359/199.1–199.4, 359/224.1–224.2
   See application file for complete search history.

(56) References Cited

U.S. PATENT DOCUMENTS

2008/0238592 A1* 10/2008 Ko et al. .................. 335/222
2009/0284816 A1* 11/2009 Davis et al. ............... 359/199.1

* cited by examiner

*Primary Examiner* — James Phan
(74) *Attorney, Agent, or Firm* — Patent Law Group LLP; David C. Hsia

(57) ABSTRACT

A micro-electro-mechanical system (MEMS) mirror device has a mirror, a frame rotatively coupled to the mirror, and a uniaxial actuator rotatively coupled to the frame where the rotational axis of the actuator is offset from the rotational axes of the mirror and the frame. Another MEMS mirror device has a mirror, a frame rotatively coupled to the mirror, and a biaxial actuator rotatively coupled to the frame where the actuator is able to rotate about the rotational axes of the mirror and the frame with the mirror.

19 Claims, 3 Drawing Sheets

MEMS DEVICE WITH OFF-AXIS ACTUATOR

FIELD OF INVENTION

This invention relates to micro-electro-mechanical system (MEMS) devices, and more particularly to MEMS scanning mirrors.

DESCRIPTION OF RELATED ART

U.S. Pat. Nos. 6,769,616 and 7,034,370 disclose a bidirectional scanning MEMS mirror system. In the system, a mirror is rotatively coupled to a frame and the frame is rotatively mounted to an anchor layer. Actuators that consist of electrodes extending from the outer perimeter of the mirror and the inner perimeter of the frame rotate the mirror about a first axis. Actuators that consist of electrode extending from the outer perimeter of the frame and the inner perimeter of stationary pads rotate the frame about a second axis. The result is a rather complicated design of the mirror and the frame that allows for rotation and electrical isolation of the voltages necessary to rotate the mirror about the first axis. Thus, what is needed is a simplified design for a bidirectional scanning MEMS mirror system.

SUMMARY

In embodiments of the invention, a micro-electro-mechanical system (MEMS) mirror device has a mirror, a frame rotatively coupled to the mirror, and a uniaxial actuator rotatively coupled to the frame where the rotational axis of the actuator is offset from the rotational axes of the mirror and the frame. This configuration allows a single uniaxial actuator to provide two axes of motion to the mirror, thereby simplifying the design of the device.

In other embodiments of the invention, a MEMS mirror device has a mirror, a frame rotatively coupled to the mirror, and a biaxial actuator rotatively coupled to the frame where the actuator is able to rotate about the rotational axes of the mirror and the frame with the mirror. This configuration allows a single biaxial actuator to provide two axes of motion to the mirror, thereby simplifying the design of the device.

BRIEF DESCRIPTION OF THE DRAWINGS

Use of the same reference numbers in different figures indicates similar or identical elements.

DETAILED DESCRIPTION OF THE INVENTION

Figure 1:
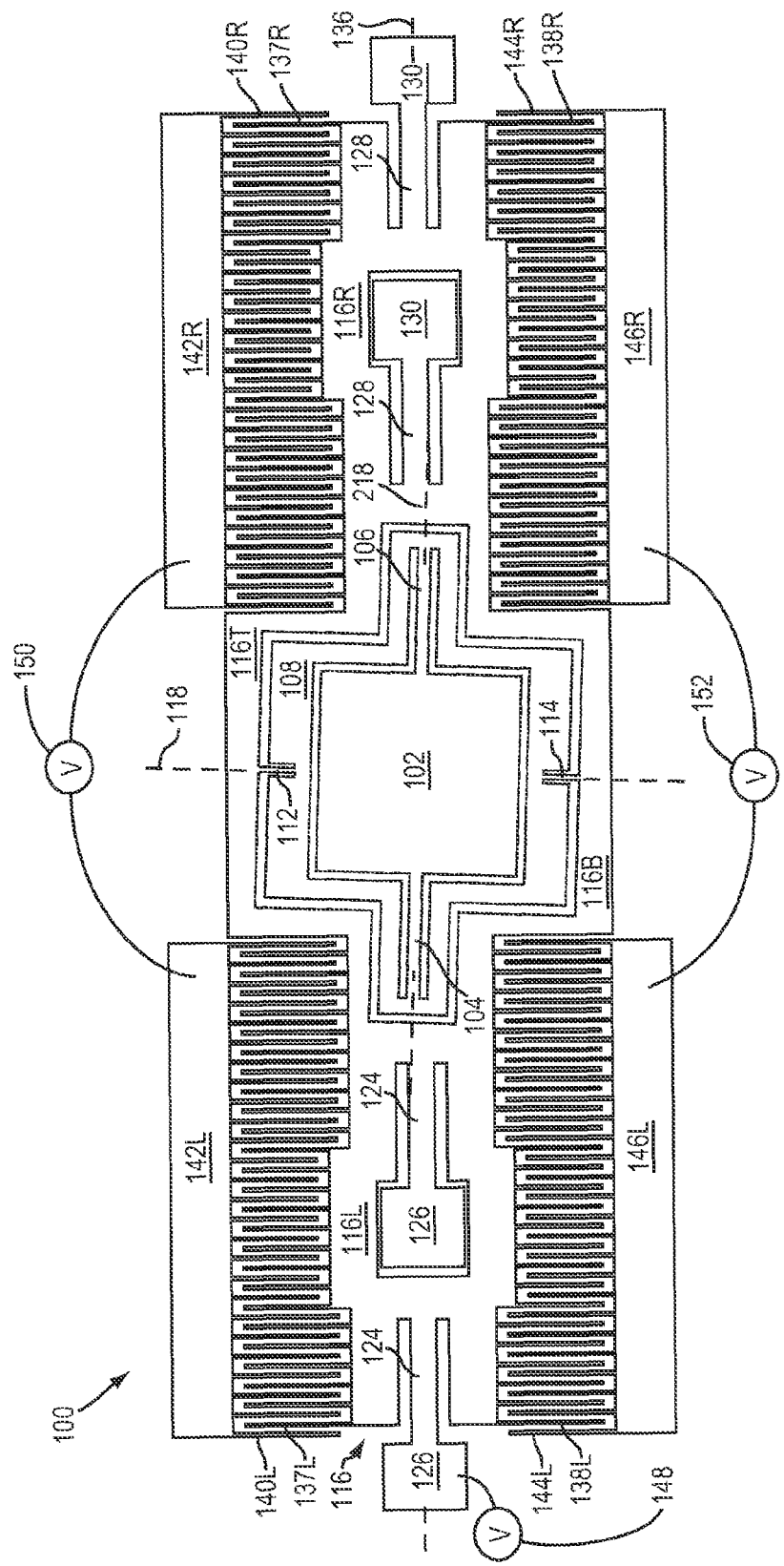
FIG. 1 is a micro-electro-mechanical system (MEMS) mirror device in one embodiment of the invention.

FIG. 1 illustrates a micro-electro-mechanical system (MEMS) mirror device 100 in one embodiment of the invention. Device 100 is typically made from a silicon substrate using conventional semiconductor processing methods (e.g., masking and etching). Device 100 can be used in any application that requires one or two axes of motion (e.g., a unidirectional or a bidirectional scanning mirror).

Device 100 includes a mirror 102 connected by springs 104 and 106 to a frame 108. The coupling between mirror 102 and springs 104 and 106 are located along a rotational axis 110 (hereafter mirror axis 110) so the mirror can rotate about the mirror axis relative to frame 108. In one embodiment, a rectangular mirror 102 is located within a rectangular frame 108, where the left and the right sides of the mirror are connected by springs 104 and 106 to the left and the right sections of the frame, respectively. Mirror 102 and frame 108 may have other shapes in other embodiments. Note that any use of direction and orientation is for illustrative purposes and is not intended to limit the actual direction and orientation of device 100 in use.

Frame 108 is connected by springs 112 and 114 to a uniaxial actuator 116. The coupling between frame 108 and springs 112 and 114 are located along a rotational axis 118 (hereafter frame axis 118) so the frame can rotate about the frame axis relative to actuator 116. Frame axis 118 is offset from mirror axis 110 so effectively mirror 102 has two axes of rotation.

Actuator 116 includes a left portion 116L and a right portion 116R (hereafter actuator portion 116L and actuator portion 116R). Actuator portion 116L is connected by one or more springs 124 to one or more stationary spring pads 126. Similarly, actuator portion 116R is connected by one or more springs 128 to one or more stationary spring pads 130. Stationary spring pads 126 and 130 are typically mounted to a substrate. For illustrative purposes, only four stationary spring pads are shown where two are located in openings in actuator portions 116L and 116R, and two are located at the ends of the actuator portions. The coupling between actuator 116 and springs 124 and 128 are located along a rotational axis 136 (hereafter actuator axis 136) so the actuator can rotate about the actuator axis. Actuator portions 116L and 116R are joined by top and bottom beams 116T and 116B so the actuator portions rotate in unison to drive frame 108 and mirror 102. Beams 116T and 116B are connected by springs 112 and 114 to the top and the bottom sections of frame 108, respectively.

To allow an uniaxial actuator 116 to provide two axes of motion to mirror 102, actuator axis 136 is offset from mirror axis 110 and frame axis 118. This configuration divides the torque generated by actuator 116 along actuator axis 136 into (1) a first torque component that rotates mirror 102 along mirror axis 110 and (2) a second torque component that rotates frame 108 along frame axis 118.

To achieve large rotation angles for mirror 102 and frame 108, a resonant frequency of the mirror about mirror axis 110 and a resonant frequency of the frame with the mirror about frame axis 118 are set equal to the scanning frequencies needed along two axes in the application of device 100. In one embodiment, the resonant frequency of mirror 102 is different than the resonant frequency of frame 108 with the mirror by at least 50% so the rotations about mirror axis 110 and frame axis 118 can be individually controlled. Typical range for the ratio of the two resonant frequencies is 1.2 to 50. Computer modeling can be used to determine the resonant frequencies of different designs for mirror 102 and frame 108.

When the resonant frequency of mirror 102 is higher than the resonant frequency of frame 108, the angle formed between actuator axis 136 and mirror axis 110 is smaller than the angle formed between the actuator axis and frame axis 118. This is because it takes more energy to excite mirror 102 as it has a higher resonant frequency so actuator axis 136 needs to be more closely aligned to mirror axis 110 than frame axis 118. The actual angles of a design depend on the resonant frequencies and other factors, including the scan angles and the moment of inertia. Typical angles may range from 1 to 40 degrees.

Actuator 116 resonantly oscillates frame 108 and mirror 102 with a motion including (1) a first oscillation with a first amplitude and a first frequency, and (2) a second oscillation with a second amplitude and a second frequency superimposed on the first oscillation. The first frequency is set equal to the resonant frequency of frame 108 with mirror 102 and the second frequency is set equal to the resonant frequency of the mirror, or vice versa. For example, actuator 116 has a motion including a large but slow oscillation that excites frame 108 with mirror 102 about frame axis 118. Along the path of the large but slow oscillation, the motion further includes a small but fast oscillation that excites mirror 102 about mirror axis 110. The oscillation of mirror 102 about mirror axis 110 can be amplified through the elastic spring coupling generally along the mirror axis.

In one embodiment, actuator 116 is an electrostatic actuator. Actuator 116 includes movable electrodes 137L and 137R (only one of each is labeled; collectively referred to as movable electrode 137) that extend from the top edges of actuator portions 116L and 116R, respectively, and movable electrodes 138L and 138R (only one of each is labeled; collectively referred to as movable electrode 138) that extend from the bottom edges of actuator portions 116L and 116R, respectively. Movable electrodes 137L and 137R are interdigitated out of plane with stationary electrodes 140L and 140R (only one of each is labeled; collectively referred to as stationary electrode 140), respectively. Stationary electrodes 140L and 140R extend from stationary electrode pads 142L and 142R (collectively referred to as stationary electrode pad 142), respectively. Note that pads 142L and 142R may be replaced with a single pad. Movable electrodes 138L and 138R are interdigitated out of plane with stationary electrodes 144L and 144R (only one of each is labeled; collectively referred to as stationary electrode 144), respectively. Stationary electrodes 114L and 114R extend from stationary electrode pads 146L and 146R (collectively referred to as stationary electrode pad 146), respectively. Note that pads 146L and 146R may be replaced with a single pad. The stationary electrodes and the stationary electrode pads are typically made from a layer above or below mirror 102, frame 108, and actuator 116.

In one embodiment, voltage sources 148, 150, and 152 are respectively coupled to actuator 116, stationary electrode pad 142, and stationary electrode pad 146. Voltage sources 148 and 150 can supply a periodic voltage difference between electrodes 137 and 140 to oscillate actuator 116 about actuator axis 136. Similarly, voltage sources 148 and 152 can supply a periodic voltage difference between electrodes 138 and 144 to oscillate actuator 116 about actuator axis 136. The two periodic voltage differences can be substantially out of phase (e.g., by 180 degrees) to work together to oscillate actuator 116.

In one embodiment, voltage source 148 provides a steady voltage (e.g., ground) to electrodes 137 and 138, voltage source 150 provides a voltage having a first waveform to electrodes 140, and voltage source 152 provides a voltage having a second waveform to electrodes 144. The first waveform has a first oscillating signal with a first amplitude and a first frequency, and a second oscillating signal with a second amplitude and a second frequency superimposed on the first signal. The second waveform is a complement of the first waveform that is substantially out of phase (e.g., by 180 degrees) with the first waveform. The first frequency is set equal to the resonant frequency of frame 108 with mirror 102 and the second frequency is set equal to the resonant frequency of the mirror, or vice versa. For example, the waveform has a first square wave signal with large amplitude but low frequency, and a second square wave signal with small amplitude but high frequency superimposed on the first square wave signal.

Figure 2:
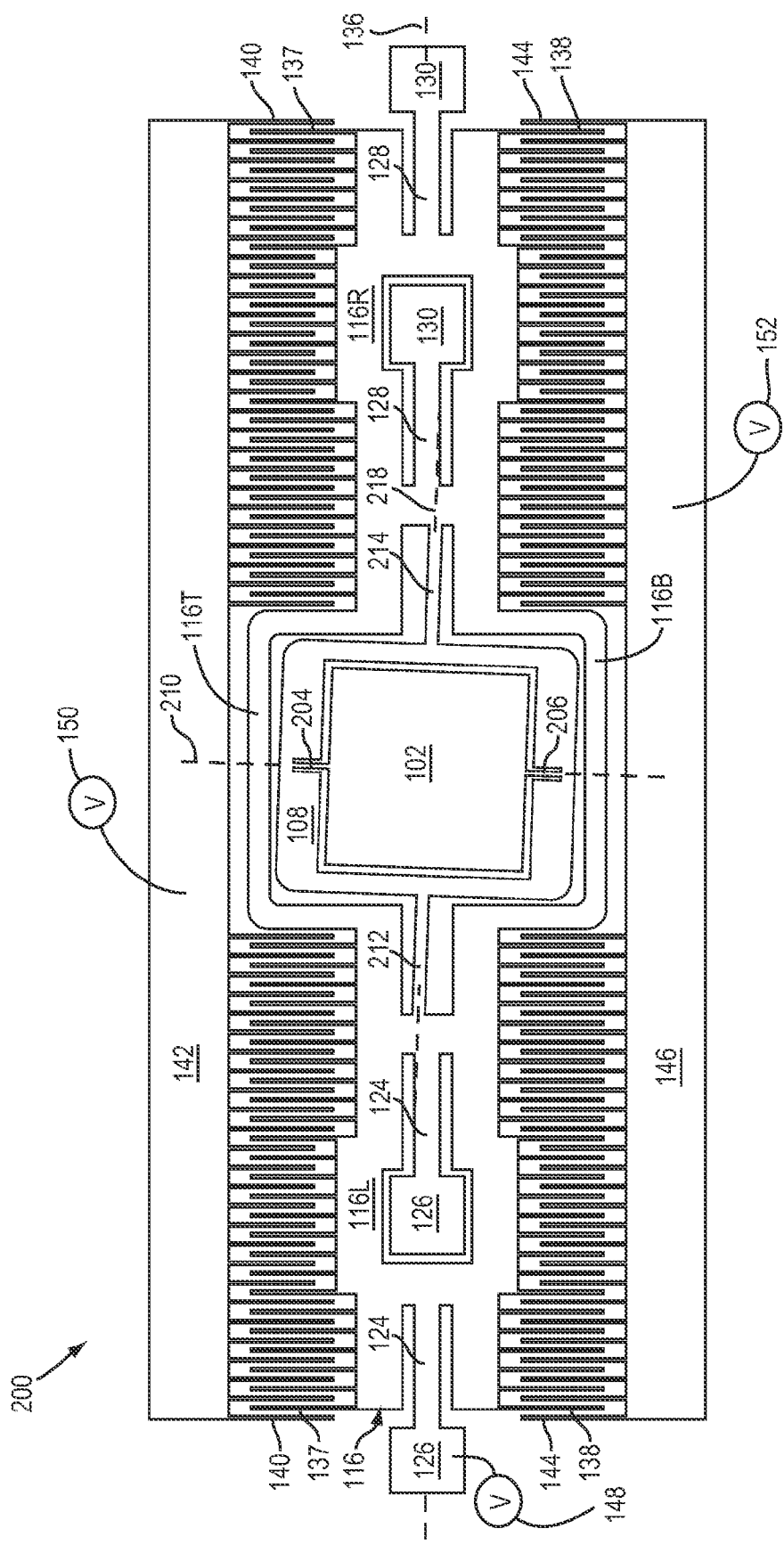
FIG. 2 is a MEMS mirror device in one embodiment of the invention.

FIG. 2 illustrates a MEMS mirror device 200 in one embodiment of the invention. Device 200 is similar to device 100 except the rotational axis 218 (hereafter frame axis 218) of frame 108 is less offset from actuator axis 136 than the rotational axis 210 (hereafter mirror axis 210) of mirror 102. In this embodiment, the top and the bottom sides of mirror 102 are connected by springs 204 and 206 to the top and the bottom sections of frame 108, respectively, and the left and the right sections of the frame are connected by springs 212 and 214 to actuator portions 116L and 116R, respectively. The coupling between mirror 102 and springs 204 and 206 are placed along mirror axis 210, and the coupling between frame 108 and springs 212 and 214 are placed along frame axis 218. Also note that a single stationary electrode pad 142 with stationary electrodes 140 is shown, and a single stationary electrode pad 146 with stationary electrodes 144 are shown.

In contrast to the arrangement of device 100, actuator axis 136 is now (1) slightly offset from frame axis 218 so they are not parallel and (2) largely offset from mirror axis 210 but they are not orthogonal. This configuration divides the torque generated by actuator 116 along actuator axis 136 into (1) a first larger torque component that rotates frame 108 with mirror 102 along frame axis 218, and (2) a second smaller torque component that rotates mirror 102 along mirror axis 210. Device 200 is driven in the same manner as device 100.

Figure 3:
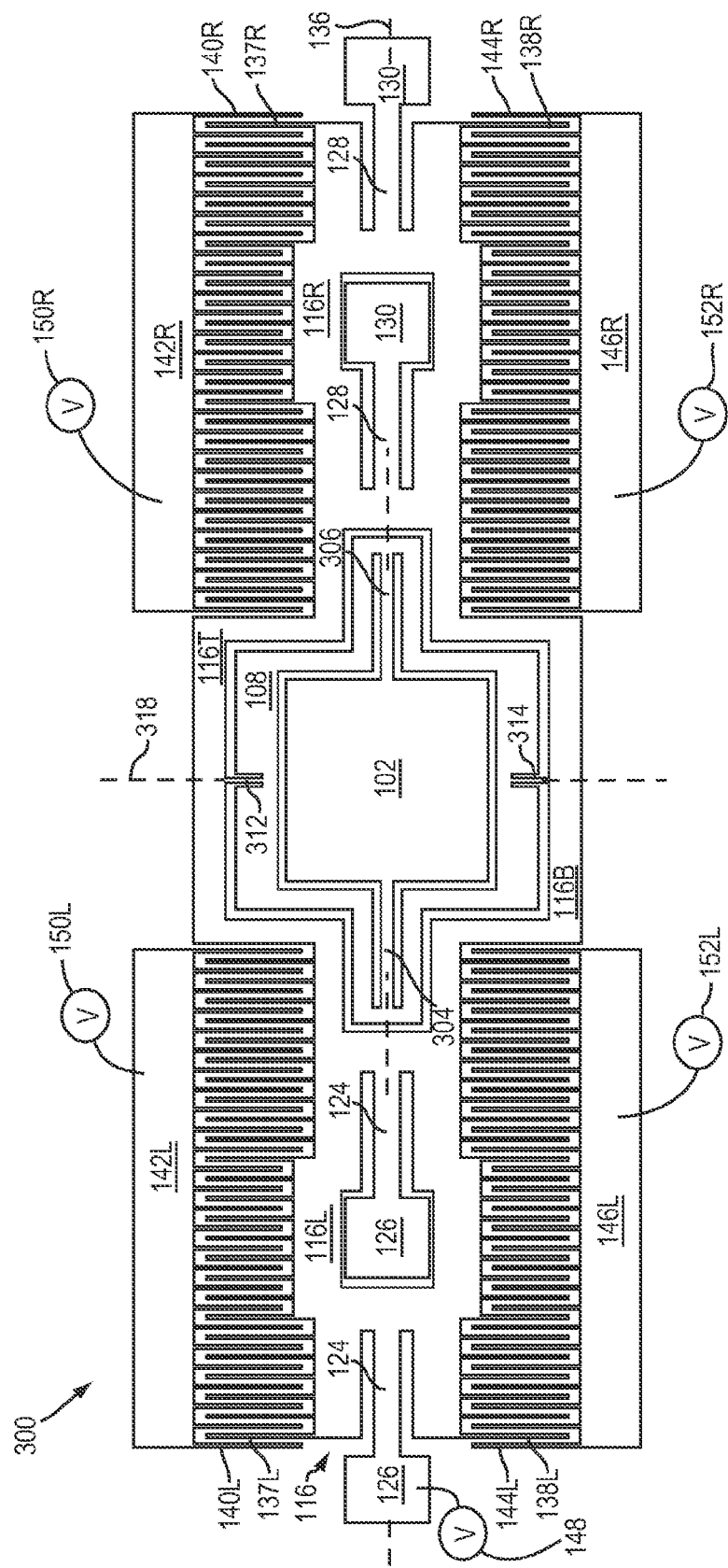
FIG. 3 is a MEMS mirror device in one embodiment of the invention.

FIG. 3 illustrates a MEMS mirror device 300 in one embodiment of the invention. Device 300 is similar to device 100 except actuator 116 now operates as a biaxial actuator that rotates about axes 136 and 318, mirror 102 rotates about axis 136, and frame 108 rotates axis 318. Axes 136 and 318 are offset and they are typically orthogonal to each other.

Actuator 116 can resonantly oscillate mirror 102 with a first oscillation about axis 136 at a first frequency. The first frequency is set equal to the resonant frequency of mirror 102 about axis 136. Actuator 116 can resonantly oscillate frame 108 with mirror 102 with a second oscillation about axis 318 at a second frequency. The second frequency is set equal to the resonant frequency of frame 108 with mirror 102 about frame axis 318. Actuator 116 can resonantly oscillate both mirror 102 and frame 108 with the mirror by providing the first and the second oscillations at the same time. The amplitudes of the first and the second oscillations are different. The oscillation of mirror 102 about axis 136 can be amplified through the elastic spring coupling generally along axis 136.

In one embodiment, voltage sources 148, 150L, 150R, 152L, and 152R are respectively coupled to actuator 116, stationary electrode pad 142L, stationary electrode pad 142R, stationary electrode pad 146L, and stationary electrode pad 146R. To rotate actuator 116 about axis 136, voltage sources 148, 150L, and 150R can supply a periodic voltage difference between electrodes 137 and electrodes 140. Similarly, voltage sources 148, 152L, and 152R can supply a periodic voltage difference between electrodes 138 and electrodes 144. The two periodic voltage differences can be substantially out of phase (e.g., by 180 degrees) to work together to oscillate actuator 116 about axis 136.

To rotate actuator 116 about axis 318, voltage sources 148, 150L, and 152L can supply a periodic voltage difference between (1) electrodes 137L/138L and (2) electrodes 140L/144L. Similarly, voltage sources 148, 150R, and 152R can supply a periodic voltage difference between (1) electrodes 137R/138R and (2) electrodes 140R/144R. The two periodic voltage differences can be substantially out of phase (e.g., by 180 degrees) to work together to oscillate actuator 116 about axis 318.

In one embodiment, the following table lists voltages for causing appropriate actuator motions. Signal V1 is a first oscillating signal having a first amplitude and a first frequency for causing oscillation about axis 318, signal V2 is a second oscillating signal having a second amplitude and a second frequency for causing oscillation about axis 136, signal V4 is a complement of signal V1 with the same amplitude and a substantial phase offset in the frequency (e.g., 180 degree offset), and signal V3 is a complement of signal V2 with the same amplitude but a substantial phase offset in the frequency (e.g., 180 degree offset). The first frequency is set equal to the resonant frequency of frame 108 with mirror 102 and the second frequency is set equal to the resonant frequency of the mirror, or vice versa. The first and the second amplitudes of the oscillating signals are different. For example, signal V1 is a first square wave signal with large amplitude but low frequency, and signal V2 is a second square wave signal with small amplitude but high frequency.

TABLE

| Voltage source | Signals (V) |
|---|---|
| 148 | Steady (e.g., ground) |
| 150L | V1 + V2 |
| 150R | V4 + V2 |
| 152L | V1 + V3 |
| 152R | V4 + V3 |

Various other adaptations and combinations of features of the embodiments disclosed are within the scope of the invention. Although rectangular mirror 102 and frame 108 are described, the mirror and the frame may be round, polygonal, or another suitable shape. Although straight springs are shown, the springs may be serpentine or another suitable shape. Although electrostatic actuator 116 is described, the actuator can be electromagnetic, piezoelectric, or another suitable technology. Although voltages having the waveform of square waves are described, the waveform can be sinusoidal, triangular, sawtooth, or another suitable waveform, Numerous embodiments are encompassed by the following claims.

The invention claimed is:

1. A micro-electro-mechanical system (MEMS) mirror device, comprising:
    a mirror;
    a frame rotatively coupled to the mirror so the mirror is rotatable about a first axis relative to the frame, the mirror has a first resonant frequency for oscillating about the first axis;
    an actuator rotatively coupled to the frame so the frame is rotatable about a second axis relative to the actuator, the second axis being offset from the first axis, the frame with the mirror has a second resonant frequency for oscillating about the second axis; and
    stationary spring pads rotatively coupled to the actuator so the actuator is rotatable about a third axis, the actuator being operable to rotate only about the third axis, the third axis being offset from the first and the second axes.

2. The device of claim 1, wherein a first angle between the first and the third axes is smaller than a second angle between the second and the third axes.

3. The device of claim 1, wherein a first angle between the first and the third axes is larger than a second angle between the second and the third axes.

4. The device of claim 1, wherein the first and the second axes are perpendicular.

5. The device of claim 1, wherein the actuator is operable to oscillate in a motion comprising (1) a first oscillation with a first frequency and (2) a second oscillation with a second frequency superimposed on the first oscillation, the first frequency being equal to one of the first and the second resonant frequencies, and the second frequency being equal to the other one of the first and the second resonant frequencies.

6. The device of claim 5, wherein amplitudes of the first and the second oscillations are different.

7. The device of claim 1, wherein:
    the actuator comprises a first portion extending from a first proximate end near the frame to a first distal end spaced from the frame along the third axis, the first portion comprising first movable electrodes and second movable electrodes that are located on the opposite sides of the third axis; and
    the device further comprises:
        first stationary electrodes interdigitated out of plane with the first movable electrodes; and
        secondary stationary electrodes interdigitated out of plane with the second movable electrodes.

8. The device of claim 7, further comprising voltage sources coupled to the actuator, the first stationary electrodes, and the second stationary electrodes to generate (1) a first periodic voltage difference between the first movable and the first stationary electrodes and (2) a second periodic voltage difference between the second movable and the second stationary electrodes, wherein:
    the first periodic voltage difference being a first waveform with (1) a first oscillating signal with a first frequency and (2) a second oscillating signal with a second frequency superimposed on the first oscillating signal, the first frequency being equal to one the first and the second resonant frequencies, and the second frequency being equal to the other one of the first and the second resonant frequencies; and
    the second periodic voltage difference being a second waveform that is a complement of the first waveform that is substantially out of phase with the first waveform.

9. The device of claim 8, wherein amplitudes of the first and the second oscillating signals are different.

10. The device of claim 8, wherein:
    the actuator further comprises:
        a second portion extending from a second proximate end near the frame to a second distal end spaced from the frame along the third axis, the first and the second portions being located on different sides of the frame, the second portion comprising third movable electrodes and fourth movable electrodes that are located on the opposite sides of the third axis; and
        top and bottom beams that connect the first and the second portions so they rotate in unison, the top and the bottom beams being rotatively coupled to the frame; and
    the device further comprises:
        third stationary electrodes interdigitated out of plane with the third movable electrodes; and
        fourth stationary electrodes interdigitated out of plane with the fourth movable electrodes.

11. The device of claim 10, wherein the voltage sources are further coupled to the third stationary electrodes and the fourth stationary electrodes to generate (1) a third periodic voltage difference between the third movable and the third stationary electrodes and (2) a fourth periodic voltage difference between the fourth movable and the fourth stationary electrodes, wherein:
    the third periodic voltage difference being the first waveform; and
    the fourth periodic voltage difference being the second waveform.

12. A method for operating a micro-electro-mechanical system (MEMS) mirror device comprising (1) a mirror, (2) a frame rotatively coupled to the mirror so the mirror is rotatable about a first axis relative to the frame, (3) an actuator rotatively coupled to the frame so the frame is rotatable about a second axis relative to the actuator, and (4) stationary spring pads rotatively coupled to the actuator so the actuator is rotatable, the mirror having a first resonant frequency, the frame with the mirror having a second resonant frequency, the method comprising:

oscillating the actuator only about a third axis offset from the first and the second axes in a motion comprising (1) a first oscillation with a first frequency and (2) a second oscillation with a second frequency superimposed on the first oscillation, the first frequency being equal to one of the first and the second resonant frequencies, and the second frequency being equal to the other one of the first and the second resonant frequencies.

13. The method of claim 12, wherein a first angle between the first and the third axes is smaller than a second angle between the second and the third axes.

14. The method of claim 12, wherein a first angle between the first and the third axes is larger than a second angle between the second and the third axes.

15. The method of claim 12, wherein the first and the second axes are perpendicular.

16. The method of claim 12, wherein amplitudes of the first and the second oscillations are different.

17. The method of claim 12, wherein said oscillating the actuator comprises providing a first periodic voltage difference, wherein the first periodic voltage difference being a first waveform with (1) a first oscillating signal with a first frequency and (2) a second oscillating signal with a second frequency superimposed on the first oscillating signal, the first frequency being equal to one of the first and the second resonant frequencies, and the second frequency being equal to the other one of the first and the second resonant frequencies.

18. The method of claim 17, wherein said oscillating the actuator further comprises providing a second periodic voltage difference, the second periodic voltage difference being a second waveform that is a complement of the first waveform that is substantially out of phase with the first waveform.

19. The method of claim 18, wherein amplitudes of the first and the second oscillating signals are different.

* * * * *

UNITED STATES PATENT AND TRADEMARK OFFICE
CERTIFICATE OF CORRECTION

PATENT NO. : 8,035,874 B1  
APPLICATION NO. : 12/392607  
DATED : October 11, 2011  
INVENTOR(S) : Yee-Chung Fu Page 1 of 1

It is certified that error appears in the above-identified patent and that said Letters Patent is hereby corrected as shown below:

Column 6,  
Line 30, Claim 8, where "one the" should read --one of the--.

Signed and Sealed this  
Twenty-second Day of November, 2011

David J. Kappos  
*Director of the United States Patent and Trademark Office*